US009324132B2

(12) United States Patent
Kim et al.

(10) Patent No.: US 9,324,132 B2
(45) Date of Patent: Apr. 26, 2016

(54) IMAGE SIGNAL PROCESSING DEVICE, IMAGE PROCESSING SYSTEM HAVING THE SAME, AND IMAGE SIGNAL PROCESSING METHOD USING THE IMAGE SIGNAL PROCESSING DEVICE

(71) Applicant: SAMSUNG ELECTRONICS CO., LTD., Suwon-si, Gyeonggi-do (KR)

(72) Inventors: Su Hee Kim, Seongnam-si (KR); Jung Gap Kuk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/208,102

(22) Filed: Mar. 13, 2014

(65) Prior Publication Data

US 2014/0328538 A1 Nov. 6, 2014

(30) Foreign Application Priority Data

May 3, 2013 (KR) ........................ 10-2013-0050019

(51) Int. Cl.
*G06K 9/00* (2006.01)
*G06T 3/40* (2006.01)
*H04N 9/04* (2006.01)

(52) U.S. Cl.
CPC .............. *G06T 3/4015* (2013.01); *H04N 9/045* (2013.01); *H04N 2209/045* (2013.01); *H04N 2209/046* (2013.01)

(58) Field of Classification Search
CPC ....... G06T 7/408; G06T 3/4007; G06T 5/001; G06T 5/007; G06T 5/009; G06T 5/50; G06T 11/001; H04N 5/2351; H04N 5/23229; H04N 9/045
See application file for complete search history.

(56) References Cited

U.S. PATENT DOCUMENTS

| | | | | |
|---|---|---|---|---|
| 7,002,627 | B1 * | 2/2006 | Raffy et al. | 348/273 |
| 7,015,962 | B2 * | 3/2006 | Acharya | 348/273 |
| 7,212,237 | B2 * | 5/2007 | Watanabe | 348/240.2 |
| 7,590,301 | B2 * | 9/2009 | Wu | 382/262 |
| 7,668,368 | B2 * | 2/2010 | Kimura | 382/167 |
| 8,411,338 | B2 * | 4/2013 | Onozawa | 358/518 |
| 8,743,229 | B2 * | 6/2014 | Kim | 348/222.1 |
| 2008/0211943 | A1 * | 9/2008 | Egawa et al. | 348/294 |
| 2014/0078346 | A1 * | 3/2014 | Imade | 348/234 |
| 2014/0328538 | A1 * | 11/2014 | Kim et al. | 382/167 |

FOREIGN PATENT DOCUMENTS

| | | |
|---|---|---|
| KR | 1020090097576 A | 9/2009 |
| KR | 1020110029217 A | 3/2011 |

* cited by examiner

*Primary Examiner* — Amir Alavi
(74) *Attorney, Agent, or Firm* — Drinker Biddle & Reath LLP

(57) ABSTRACT

An image signal processing device is disclosed, including a sensitivity improvement unit, a Bayer RGB conversion unit, and a color correction unit. The sensitivity improvement unit interpolates input white, red, green, and blue (WRGB) data, mixes a luminance signal of first color space data for the interpolated WRGB data with a first type pixel signal of the interpolated WRGB data to convert the first color space data into second color space data, and converts the second color space data into converted RGB data. The Bayer RGB conversion unit converts color spaces of a second type pixel signal, a third type pixel signal, and a fourth type pixel signal of the interpolated WRGB data to generate the first color space data, and separates the luminance signal and color difference signals from the first color space data. The color correction unit corrects the converted RGB data into output RGB data.

20 Claims, 7 Drawing Sheets

IMAGE SIGNAL PROCESSING DEVICE, IMAGE PROCESSING SYSTEM HAVING THE SAME, AND IMAGE SIGNAL PROCESSING METHOD USING THE IMAGE SIGNAL PROCESSING DEVICE

CROSS-REFERENCE TO RELATED APPLICATION(S)

This application claims the priority benefit under 35 U.S.C. §119(a) from Korean Patent Application No. 10-2013-0050019, filed on May 3, 2013 in the Korean Intellectual Property Office, the disclosure of which is incorporated herein by reference in its entirety.

BACKGROUND

1. Field

Various embodiments of the invention relate to an image signal processing device and method and an image processing system using the same.

2. Related Art

As the size of sensors is decreased, the resolution of the sensors is being gradually increased. As a result, novel sensors having improved sensitivity have been developed.

One of the novel sensors is a sensor, having a white, red, green, and blue (WRGB) color filter array layout, which blocks only infrared and ultraviolet light without filtering through a color filter to provide a white pixel using white information of relatively high sensitivity.

SUMMARY

Various embodiments of the invention provide an image signal processing device and method that convert a white, red, green, and blue (WRGB) color filter array into Bayer RGB and an image processing system using the same.

Additional embodiments of the invention will be set forth in part in the description which follows and, in part, will be apparent from the description, or may be learned by practice of the invention.

In accordance with an embodiment, an image signal processing device may include a sensitivity improvement unit that interpolates input white, red, green, and blue (WRGB) data, mixes a luminance signal of first color space data for the interpolated WRGB data with a first type pixel signal of the interpolated WRGB data to convert the first color space data into second color space data, and converts the second color space data into converted RGB data. The image signal processing device includes a Bayer RGB conversion unit that converts color spaces of a second type pixel signal, a third type pixel signal, and a fourth type pixel signal of the interpolated WRGB data to generate the first color space data, and separates the luminance signal and color difference signals from the first color space data. The image signal processing device further includes a color correction unit to correct the converted RGB data into output RGB data.

When converting the first color space data into the second color space data, the sensitivity improvement unit may denoise the first type pixel signal and mix the luminance signal with the denoised first type pixel signal.

The sensitivity improvement unit may apply bilinear interpolation to the input WRGB data to perform full-restoration by interpolation.

The Bayer RGB conversion unit may generate the first color space data through convolution of a color space conversion matrix, a white balance correction matrix, and a matrix of the second, third, and fourth type pixel signals of the interpolated WRGB data.

The first color space data may be calculated as:

$$\begin{pmatrix} Y \\ Cb \\ Cr \end{pmatrix} = \begin{pmatrix} YCC_0 & YCC_1 & YCC_2 \\ YCC_3 & YCC_4 & YCC_5 \\ YCC_6 & YCC_7 & YCC_8 \end{pmatrix} * \begin{pmatrix} WB_R & & \\ & 1 & \\ & & WB_B \end{pmatrix} * \begin{pmatrix} R \\ G \\ B \end{pmatrix}$$

Where $$\begin{pmatrix} Y \\ Cb \\ Cr \end{pmatrix}$$

is a matrix of the first color space data, $$\begin{pmatrix} YCC_0 & YCC_1 & YCC_2 \\ YCC_3 & YCC_4 & YCC_5 \\ YCC_6 & YCC_7 & YCC_8 \end{pmatrix}$$

is a color space conversion matrix, $$\begin{pmatrix} WB_R & & \\ & 1 & \\ & & WB_B \end{pmatrix}$$

is a white balance correction matrix, and $$\begin{pmatrix} R \\ G \\ B \end{pmatrix}$$

is a matrix of the second, third, and fourth type pixel signals of the interpolated WRGB data.

The sensitivity improvement unit may generate the converted RGB data through convolution of an inverse matrix of the white balance correction matrix, an inverse matrix of the color space conversion matrix, and a matrix of the first color space data.

The converted RGB data may be calculated as:

$$\begin{pmatrix} R_W \\ G_W \\ B_W \end{pmatrix} = \begin{pmatrix} WB'_R & & \\ & 1 & \\ & & WB'_B \end{pmatrix} * \begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix} * \begin{pmatrix} Y \\ Cb \\ Cr \end{pmatrix}$$

Where $$\begin{pmatrix} R_W \\ G_W \\ B_W \end{pmatrix}$$

is a matrix of the converted RGB data, $$\begin{pmatrix} WB'_R & & \\ & 1 & \\ & & WB'_B \end{pmatrix}$$

is an inverse matrix of a white balance correction matrix, $$\begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix}$$

is an inverse matrix of a color space conversion matrix, and $$\begin{pmatrix} Y \\ Cb \\ Cr \end{pmatrix}$$

is a matrix of the first color space data.

The first color space data may be $YC_bC_r$ data, where Y is the luminance signal and $C_b$ and $C_r$ are the color difference signals.

The second color space data may be $Y'C_bC_r$ data, where Y' is a mixed signal of the luminance signal and the first type pixel signal and Cb and $C_r$ are the color difference signals.

The first type pixel signal may be white, the second type pixel signal may be red, the third type pixel signal may be green, and the fourth type pixel signal may be blue.

According to another embodiment, an image signal processing method may include: interpolating input WRGB data; converting color spaces of a second type pixel signal, a third type pixel signal, and a fourth type pixel signal of the interpolated WRGB data to generate first color space data; mixing a luminance signal of the first color space data with a first type pixel signal of the interpolated WRGB data to convert the first color space data into second color space data; converting the second color space data into converted RGB data; color-correcting the converted RGB data into output RGB data; and outputting the output RGB data to an image signal processor.

The generating of the first color space data may include generating the first color space data through convolution of a matrix of the second, third, and fourth type pixel signals of the interpolated WRGB data, a color space conversion matrix, and a white balance correction matrix.

The converting of the second color space data into the converted RGB data may include generating the converted RGB data through convolution of a matrix of the second color space data, an inverse matrix of the white balance correction matrix, and an inverse matrix of the color space conversion matrix.

The method may further include separating the luminance signal and color difference signals from the first color space data. The separating of the luminance signal and the color difference signals from the first color space data may be performed after the generating of the first color space data and before the converting the first color space data into the second color space data.

The converting of the first color space data into the second color space data may include: denoising the first type pixel signal when converting the first color space data into the second color space data; and mixing the denoised first type pixel signal with the luminance signal.

The first color space data may be $YC_bC_r$ data, where Y is the luminance signal and $C_b$ and $C_r$ are color difference signals.

The second color space data may be $Y'C_bC_r$ data, where Y' is a mixed signal of the luminance signal and the first type pixel signal and $C_b$ and $C_r$ are color difference signals.

The first type pixel signal may be white, the second type pixel signal may be red, the third type pixel signal may be green, and the fourth type pixel signal may be blue.

In accordance with another embodiment, an image processing system may include an image sensor that captures an image of a subject through incident light and an image signal processing device that converts input WRGB data received from the image sensor into Bayer RGB data.

The image signal processing device may include a sensitivity improvement unit that interpolates input white, red, green, and blue (WRGB) data, mixes a luminance signal of first color space data for the interpolated WRGB data with a first type pixel signal of the interpolated WRGB data to convert the first color space data into second color space data, and converts the second color space data into converted RGB data. The image signal processing device includes a Bayer RGB conversion unit that converts color spaces of a second type pixel signal, a third type pixel signal, and a fourth type pixel signal of the interpolated WRGB data to generate the first color space data, and separates the luminance signal and color difference signals from the first color space data. The image signal processing device further includes a color correction unit to correct the converted RGB data into output RGB data.

The first type pixel signal may be white, the second type pixel signal may be red, the third type pixel signal may be green, and the fourth type pixel signal may be blue.

BRIEF DESCRIPTION OF THE DRAWINGS

These and/or other embodiments will become apparent and more readily appreciated from the following description of the embodiments, taken in conjunction with the accompanying drawings of which.

DETAILED DESCRIPTION

Figure 1:
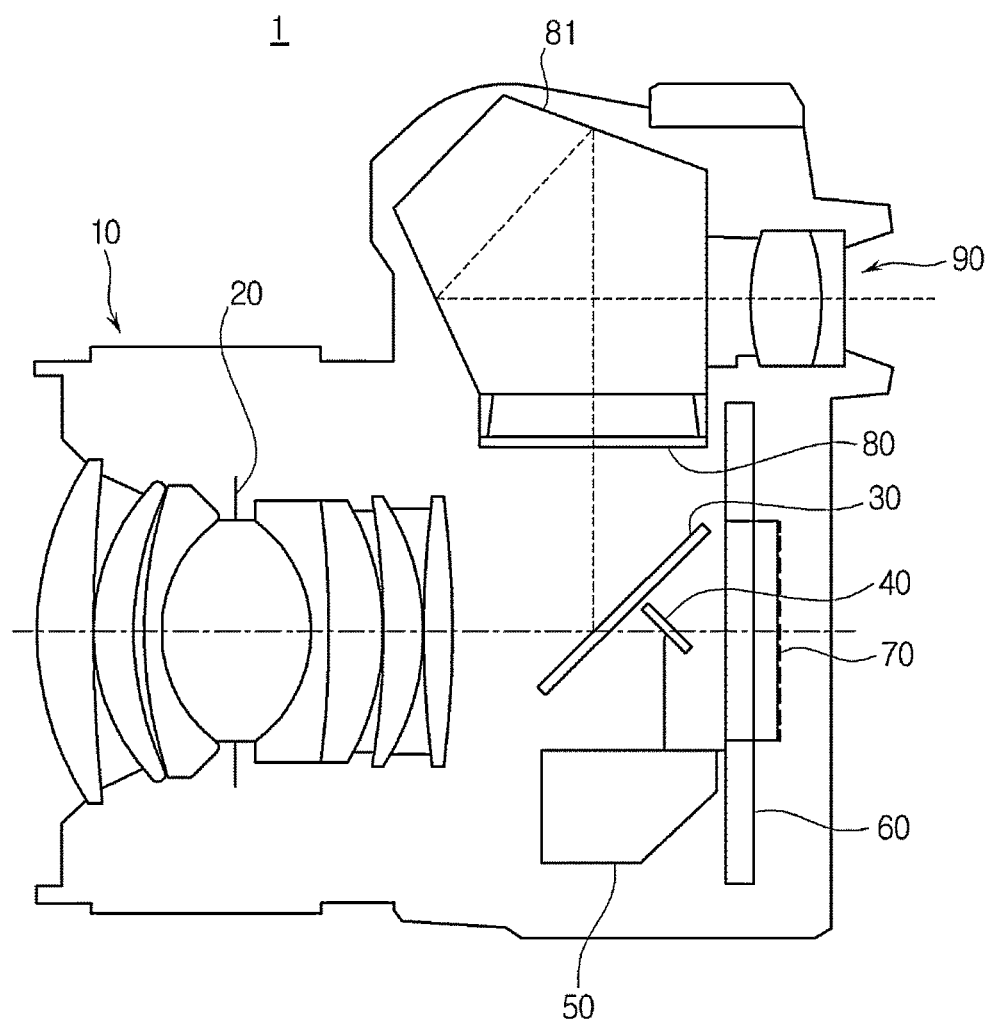
FIG. 1 is a schematic diagram showing an example of the structure of a camera device.

Reference will now be made in detail to the embodiments of the invention, examples of which are illustrated in the accompanying drawings, wherein like reference numerals refer to like elements throughout. In the following description of the embodiments, a detailed description of known functions and configurations incorporated herein will be omitted when it may obscure the subject matter of the embodiments. In this specification, terms "first," "second," etc. are used to distinguish one component from other components and, therefore, the components are not limited by the terms.

FIG. 1 is a schematic diagram showing an example of a structure of an electronic device, such as a camera device 1. A digital single-lens reflex (DSLR) camera will be described as an example of the camera device 1.

As shown in FIG. 1, the camera device 1 may include a photographing lens 10, an aperture 20, a main mirror 30, a sub mirror 40, an auto focusing (AF) module 50, a focal plane shutter 60, an imaging region 70, a focusing screen 80, a pentaprism 81, and an ocular lens 90.

More specifically, the photographing lens 10 may collect light from a subject to form an image of the subject on the imaging region 70. The photographing lens 10 may include a plurality of lenses. In this case, the lenses may include optical groups defined with various functions.

In addition, the photographing lens 10 may include an image stabilizer (not shown) and an AF driving unit (not shown). The image stabilizer prevents deterioration in quality of a picture due to hand shaking of a user during photographing. The AF driving unit receives AF information from the AF module 50 and drives the lenses of the photographing lens 10 for focusing.

The photographing lens 10 may include the aperture 20. The aperture 20 may adjust an amount of light transmitted through the photographing lens 10 and depth of field of a picture. For example, when the aperture 20 is widened, the photographing lens 10 may transmit a larger amount of light. Consequently, a user of the camera 1 may take a brighter picture. When the aperture 20 is widened, however, the aperture 20 of the photographing lens 10 is increased with the result that depth of field of the picture is decreased. On the other hand, when the aperture 20 is narrowed, the photographing lens 10 may transmit a smaller amount of light. Consequently, a user of the camera 1 may take a darker picture. When the aperture 20 is narrowed, however, the aperture 20 of the photographing lens 10 is decreased with the result that depth of field of the picture is increased.

The aperture 20 is disposed between the lenses of the photographing lens 10. Consequently, images of the aperture 20 are formed by the lenses of the photographing lens 10. Specifically, a virtual image of the aperture 20 formed by the lens of the photographing lens 10 disposed in front of the aperture 20 (between a subject and the aperture 20) is referred to as an entrance pupil and a virtual image of the aperture 20 formed by the lens of the photographing lens 10 disposed at the rear of the aperture 20 (e.g., between the aperture 20 and the imaging region 70) is referred to as an exit pupil. The exit pupil is the image of the aperture 20 and plays an important role in picture brightness. Consequently, the exit pupil is important in brightness adjustment and AF functions.

The main mirror 30 may transmit a first portion of light transmitted through the photographing lens 10 and reflect a second portion of the light (e.g., a remainder). Specifically, the main mirror 30 reflects the second portion of the light transmitted through the photographing lens 10 to the focusing screen 80 such that a user may see the light through the ocular lens 90. The first portion of the light is transmitted by the main mirror 30 and may be used in focus detection.

The camera device 1 may perform a through-the-lens (TTL) function through the main mirror 30. The TTL function includes viewfinder, metering, and focusing functions using light transmitted through the photographing lens 10.

Specifically, the TTL viewfinder function generally refers to using a viewfinder to reflect light transmitted through the photographing lens 10 such that a user may directly confirm an image to be photographed through the viewfinder. The TTL metering function generally refers to measurement of brightness of an image to be photographed using reflected light transmitted through the photographing lens 10. In this case, the TTL metering may be used in auto exposure (AF) adjustment.

The TTL focusing function generally refers to focusing of a subject using reflected light transmitted through the photographing lens 10. In this case, the TTL focusing may be used in auto focusing (AF) detection.

The sub mirror 40 reflects the light transmitted through the main mirror 30 such that the light transmitted through the main mirror 30 is reflected to be incident upon the AF module 50. In this case, the sub mirror 40 may be disposed at an acute angle (greater than 0 degrees and less than 90 degrees) relative to the main mirror 30. The sub mirror 40 may be disposed at the rear end of the main mirror 30 to reflect light transmitted through the main mirror 30 toward the AF module 50. In this case, the sub mirror 40 is an optical device. This optical device serves to provide light to the AF module 50.

The AF module 50 serves to determine whether a subject of an image is focused under control of a controller (not shown). When the subject is not in focus, the AF module 50 transmits a drive signal to a drive unit (not shown) of the photographing lens 10 such that the subject is focused on under control of the controller (not shown).

The focal plane shutter 60 is installed before the imaging region 70 near a focal plane of a camera body of the camera device 1. In one implementation, the focal plane shutter 60 may include two black shields or metal films, which are referred to as front and rear films, coated with rubber. During photographing, the front film of the focal plane shutter 60 is opened to expose the imaging region 70 to light and the rear film of the focal plane shutter 60 is closed to block light. Consequently, the focal plane shutter 60 may adjust shutter speed using a time difference between the front film and the rear film. A horizontal travel mode or a vertical travel mode may be used according to an advancing direction of the front film and the rear film. The vertical travel mode may be mainly used. The focal plane shutter 60 is not limited to the two black films. In alternative implementations, the focal plane shutter 60 may include a lens shutter, a Thornton shutter, or a light value shutter.

The imaging region 70 is a region exposed to incident light at which an image of a subject may be captured (e.g., photographed). For a film camera, a film may be located at the imaging region 70. For a digital camera, on the other hand, image sensors may be arranged at the imaging region 70. An image sensor to captures an image of a subject is disposed at the imaging region 70 of the camera device 1. Image sensors used in a digital camera may be classified as a charge coupled device (CCD) or a complementary metal oxide semiconductor (CMOS), types of which are different but which have the same basic principles.

The focusing screen 80 may include a matte surface (not shown) and a Fresnel lens (not shown). The matte surface may be disposed at a position optically equivalent to the focal plane during photographing. Consequently, a same or substantially similar image as the photographed image is displayed on the matte surface. The Fresnel lens condenses light transmitted through the matte surface such that a user sees a brighter image through the ocular lens 90.

The pentaprism 81 is a pentagonal prism. The pentaprism 81 functions to convert an erect inverse image formed on the focusing screen 80 into an erect normal image. Consequently, a user may view and confirm an image to be photographed having the same shape as what the user sees with eyes through the viewfinder. The erect inverse image may be an image having normal top and bottom and inverse left and right. The erect normal image may be an image having normal top and bottom and left and right.

The ocular lens 90 in one example makes a virtual image 1 meter ahead such that a user may confirm an image formed on the focusing screen 80. Consequently, the user may confirm an image to be photographed through the ocular lens 90.

An image processing system 100 (FIG. 2), which will hereinafter be described, photographs an image to generate an image file. The image processing system 100 may be provided in a personal digital assistant (PDA), portable multimedia player (PMP), mobile phone, smartphone, navigation device, or laptop computer including an ultra-mobile PC (UMPC), in which a camcorder, camera module, or the camera device 1 as described above are mounted. However, embodiments of the invention are not limited thereto.

Figure 2:
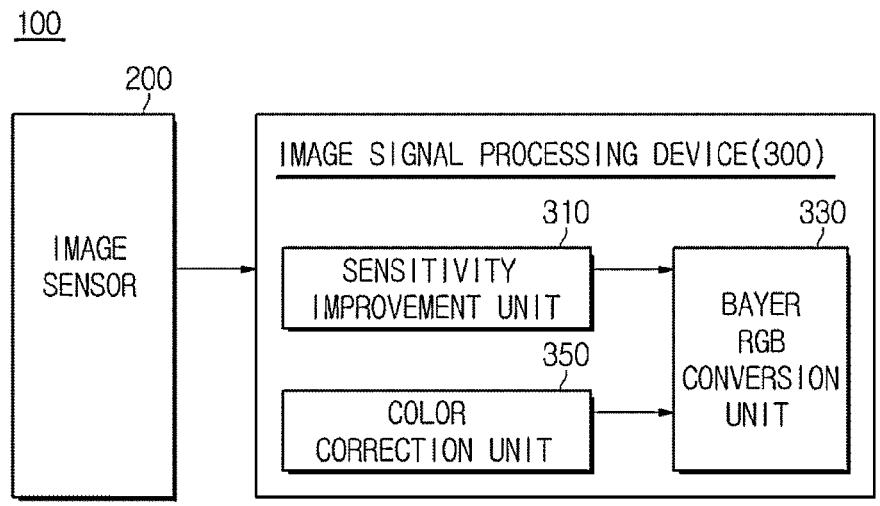
FIG. 2 is a block diagram showing an embodiment of an image processing system.
Figure 4:
FIG. 4 is a block diagram illustrating an image signal processing method.
Figure 5A:
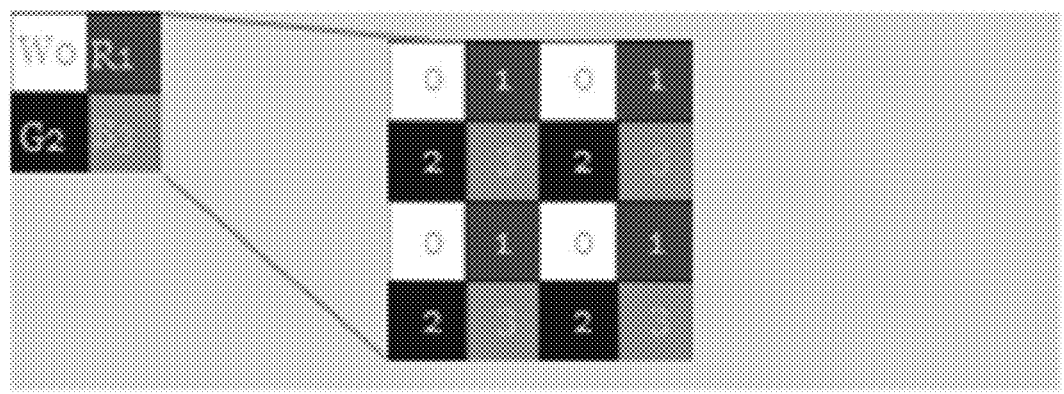
FIGS. 5A to 5C are diagrams illustrating a method of interpolating white, red, green, and blue (WRGB) data.
Figure 5B:
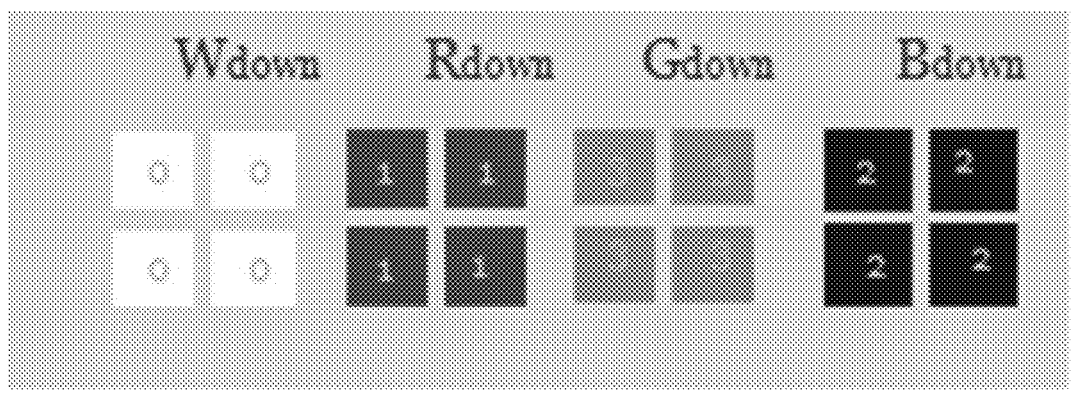
Figure 5C:
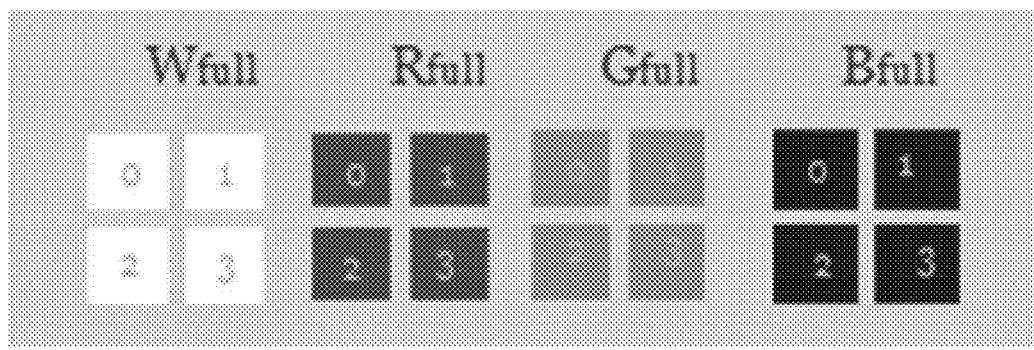
Figure 6:
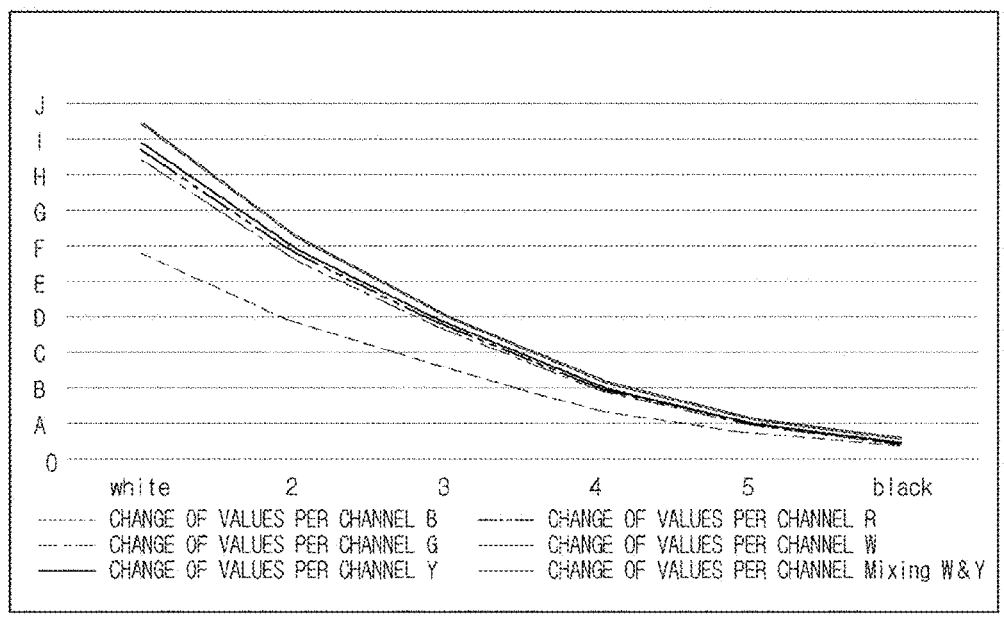
FIGS. 6 and 7 are diagrams illustrating a denoising method of a white pixel signal.
Figure 7:
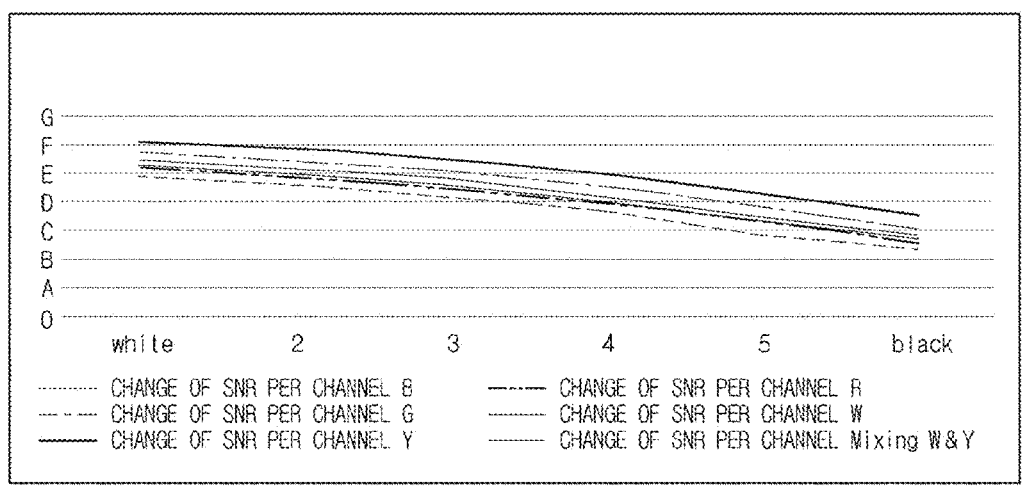
Figure 8:
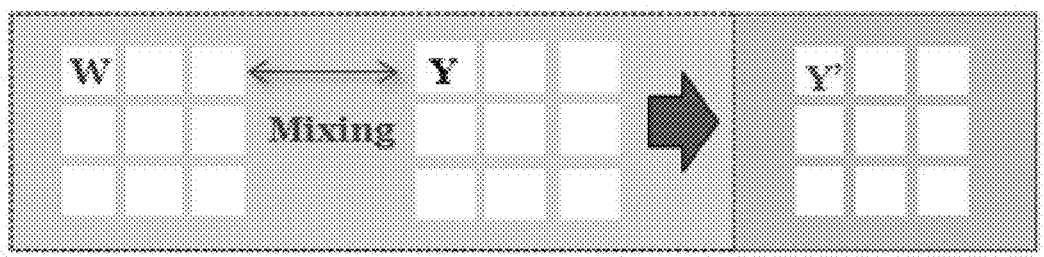
FIG. 8 is a diagram illustrating a method of mixing a white pixel signal and a luminance signal.

FIG. 2 is a block diagram showing an embodiment of an image processing system 100. Hereinafter, the image processing system 100 will be described with reference to FIG. 4 illustrating an image signal processing method, FIGS. 5A, 5B, and 5C illustrating a method of interpolating white, red, green, and blue (WRGB) data, FIGS. 6 and 7 illustrating a denoising method of a white pixel signal, and FIG. 8 illustrating a method of mixing a white pixel signal and a luminance signal.

As shown in FIG. 2, the image processing system 100 may include an image sensor 200 and an image signal processing device 300. As shown in FIG. 4, the image signal processing device 300 may include a sensitivity improvement unit 310, a Bayer RGB conversion unit 330, and a color correction unit 350, which are configurations to change a WRGB color filter array (CFA) received from the image sensor 200 into the form of a Bayer pattern.

The sensitivity improvement unit 310 may interpolate input WRGB data and mix a luminance signal of first color space data with a first type pixel signal to convert the first color space data into second color space data. The Bayer RGB conversion unit 330 calculates the luminance signal from the first color space data and separates the luminance signal from color difference signals of the first color space data. In addition, the sensitivity improvement unit 310 may convert the second color space data into RGB data. The first type pixel signal may be white.

The sensitivity improvement unit 310 may apply bilinear interpolation to the input WRGB data to perform interpolation. However, embodiments of the invention are not limited thereto. For example, other interpolation methods such as nearest neighbor interpolation may be applied. Bilinear interpolation is interpolation using an average value of adjacent pixels. A newly generated pixel is derived from a weighted sum of the nearest four pixels. Each weight is directly proportional to the distance from each pixel. Bilinear interpolation may use three linear interpolations. Bilinear interpolation may be used to calculate a "softer" image than the nearest neighbor interpolation.

The first color space data may be $YC_bC_r$ data, where Y may be a luminance signal and $C_b$ and $C_r$ may be color difference signals. $YC_bC_r$ is a kind of color space used in an imaging system. $YC_bC_r$ may be referred to as YCC. $YC_bC_r$ is not an absolute color space but one of RGB information encoding modes. Colors of an image actually seen depend on original RGB information used to display signals.

The second color space data may be $Y'C_bC_r$ data, where Y' may be a mixed signal of a luminance signal and a first type pixel signal. The first type pixel signal may be white. Second, third, and fourth type pixel signals may be red, green, and blue, respectively.

For example, the sensitivity improvement unit 310 may convert input WRGB data including $\{W_0, R_1, G_2, B_3\}$ (see FIG. 5A) into a form of FIG. 5B through down sampling and may calculate the WRGB data as a form of $W=\{W_0, W_1, W_2, W_3\}$, $R=\{R_0, R_1, R_2, R_3\}$, $G=\{G_0, G_1, G_2, G_3\}$, $B=\{B_0, B_1, B_2, B_3\}$ as shown in FIG. 5C through full-restoration by interpolation to provide interpolated WRGB data.

In addition, when converting the first color space data into the second color space data, the sensitivity improvement unit 310 may denoise the first type pixel signal and mix the luminance signal with the denoised first type pixel signal. The denoising process is provided for a case in which both an output level and signal-to-noise ratio (SNR) performance of a first type pixel signal (W) channel are below a desired threshold. In this case, the denoising process may improve reliability of image processing results.

For example, FIG. 6 is a diagram showing a comparison of output levels per channel. As shown in FIG. 6, output levels are as follows: W>MIXING (mixture of W and Y)>Y>R>G>B. FIG. 7 is a diagram showing a comparison of SNRs. As shown in FIG. 7, SNRs are as follows: Y>G>MIXING (mixture of W and Y)>W>R>B. From Y, G, MIXING, and W, the SNR of W is lowest. To provide for this case, the sensitivity improvement unit 310 denoises the first type pixel signal (W) before mixing the first type pixel signal (W) and the luminance signal (Y) such that the first type pixel signal (W) is denoised to the same level as the second type pixel signal (R), the third type pixel signal (G), and the fourth type pixel signal (B), thereby improving SNR performance. For example, the sensitivity improvement unit 310 may scan a picture with a 3×3 mask size and blur a portion which is determined as noise. However, embodiments of the invention are not limited thereto. Other denoising methods may be applied.

As shown in FIG. 8, the sensitivity improvement unit 310 may couple the denoised first type pixel signal (W) and the luminance signal (Y) to generate second color space data $Y'C_bC_r$, where Y' may be a value obtained by mixing Y with W having higher sensitivity than Y.

The Bayer RGB conversion unit 330 may convert color spaces of a second type pixel signal, a third type pixel signal, and a fourth type pixel signal of interpolated WRGB data to generate first color space data and to separate a luminance signal and color difference signals from the first color space data. The second type pixel signal, the third type pixel signal, and the fourth type pixel signal may be red, green, and blue, respectively. In addition, the first color space data may be $YC_bC_r$ data, where Y may be a luminance signal and $C_b$ and $C_r$ may be color difference signals. $YC_bC_r$ is a kind of color space used in an imaging system. $YC_bC_r$ may be referred to as YCC.

More specifically, the Bayer RGB conversion unit 330 may generate first color space data through convolution (* of Equation 1) of a color space conversion matrix to convert interpolated RGB data into first color space data, a white balance correction matrix, and a matrix of second, third, and fourth type pixel signals of interpolated WRGB data. The first color space data may be calculated by Equation 1.

$$\begin{pmatrix} Y \\ Cb \\ Cr \end{pmatrix} = \begin{pmatrix} YCC_0 & YCC_1 & YCC_2 \\ YCC_3 & YCC_4 & YCC_5 \\ YCC_6 & YCC_7 & YCC_8 \end{pmatrix} * \begin{pmatrix} WB_R & & \\ & 1 & \\ & & WB_B \end{pmatrix} * \begin{pmatrix} R \\ G \\ B \end{pmatrix} \quad \text{[Equation 1]}$$

Where $$\begin{pmatrix} Y \\ Cb \\ Cr \end{pmatrix}$$

may be a matrix of first color space data, $$\begin{pmatrix} YCC_0 & YCC_1 & YCC_2 \\ YCC_3 & YCC_4 & YCC_5 \\ YCC_6 & YCC_7 & YCC_8 \end{pmatrix}$$

may be a color space conversion matrix (e.g., for RGB to $YC_bC_r$ color space conversion), $$\begin{pmatrix} WB_R & & \\ & 1 & \\ & & WB_B \end{pmatrix}$$

may be a white balance correction matrix, and $$\begin{pmatrix} R \\ G \\ B \end{pmatrix}$$

may be a matrix of second, third, and fourth type pixel signals.

White balance correction is an operation of balancing the second, third, and fourth type pixel signals (R, G, and B) to gray such that the second, third, and fourth type pixel signals are not biased to specific colors of red, green, and blue. R and B in one example are adjusted based on a value of G such that R and B become an achromatic color. For example, white balance correction calculates a WB correction matrix using values obtained by dividing G by R, G, and B to balance a ratio of R, G, and B to 1:1:1. As a result, more reliable data processing may be performed during a subsequent image processing operation.

The sensitivity improvement unit 310 may generate RGB data ($R_wG_wB_w$ of Equation 2) through convolution of an inverse matrix of the white balance correction matrix, an inverse matrix of the color space conversion matrix, and a matrix of the first color space data. In this case, the RGB data may be calculated by Equation 2. The RGB data may be defined as data in which sensitivity characteristics of W are distributed to R, G, and B channels such that high sensitivity characteristics of W may be shared with the other channels unlike existing RGB data.

$$\begin{pmatrix} R_W \\ G_W \\ B_W \end{pmatrix} = \begin{pmatrix} WB'_R & & \\ & 1 & \\ & & WB'_B \end{pmatrix} * \begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix} * \begin{pmatrix} Y \\ Cb \\ Cr \end{pmatrix}$$ [Equation 2]

Where $$\begin{pmatrix} R_W \\ G_W \\ B_W \end{pmatrix}$$

may be a matrix of RGB data, $$\begin{pmatrix} WB'_R & & \\ & 1 & \\ & & WB'_B \end{pmatrix}$$

may be an inverse matrix of a white balance correction matrix, $$\begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix}$$

may be an inverse matrix of a color space conversion matrix, and $$\begin{pmatrix} Y \\ Cb \\ Cr \end{pmatrix}$$

may be a matrix of first color space data.

Figure 3:
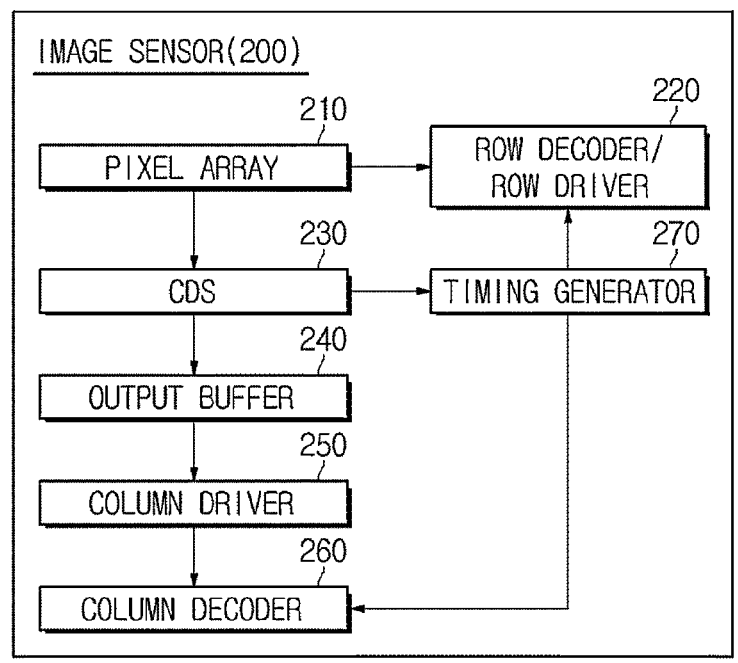
FIG. 3 is a block diagram showing an embodiment of an image sensor of the image processing system of FIG. 2.

FIG. 3 is a block diagram showing an embodiment of the image sensor 200.

The image sensor 200 may include a pixel array 210, a row decoder/row driver 220, a correlated double sampling (CDS) unit 230, an output buffer 240, a column driver 250, a column decoder 260, and a timing generator 270.

More specifically, the pixel array 210 may include a plurality of two-dimensional matrix type pixels connected to a plurality of row lines and a plurality of column lines.

The row decoder/row driver 220 may decode a row control signal generated by the timing generator 270 and select at least one row line from the plurality of row lines of the pixel array in response to the decoded row control signal.

The correlated double sampling unit 230 may perform correlated double sampling on a pixel signal output from a unit pixel connected to one column line of the plurality of column lines of the pixel array 210. In this case, the correlated double sampling unit 230 may include an analog-to-digital converter (not shown) to perform analog-to-digital conversion on the correlated double sampled pixel signal.

The output buffer 240 may buffer pixel signals output from the correlated double sampling unit 230 in response to a column control signal output from the column driver 250.

The column driver 250 may selectively activate at least one of the column lines of the pixel array 210 in response to a decoded control signal output from the column decoder 260. The column decoder 260 may decode a column control signal generated by the timing generator 270.

The timing generator 270 may generate a control signal to control the operation of at least one of the pixel array 210, the row decoder/row driver 220, the output buffer 240, and the column decoder 260.

Figure 9:
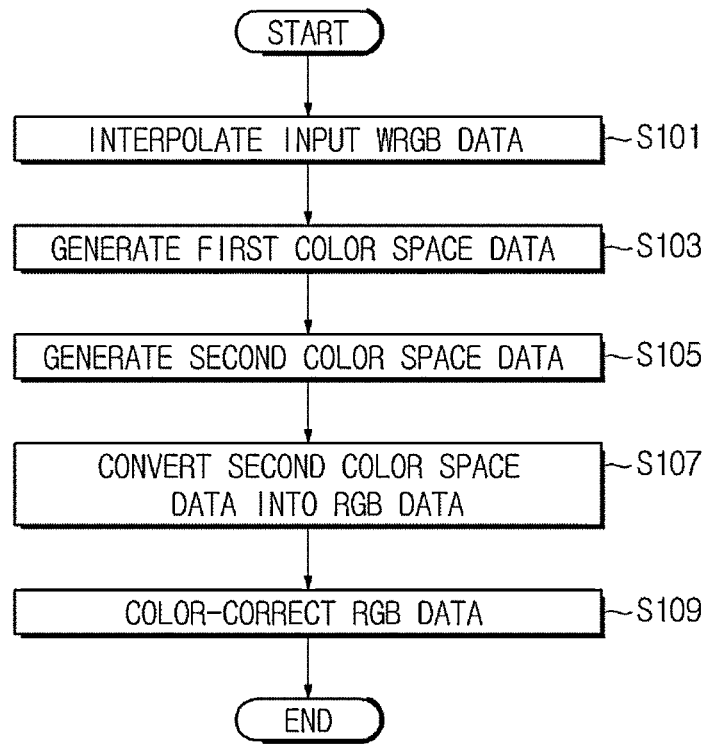
FIG. 9 is a flowchart illustrating an embodiment of the image signal processing method.
Figure 10:
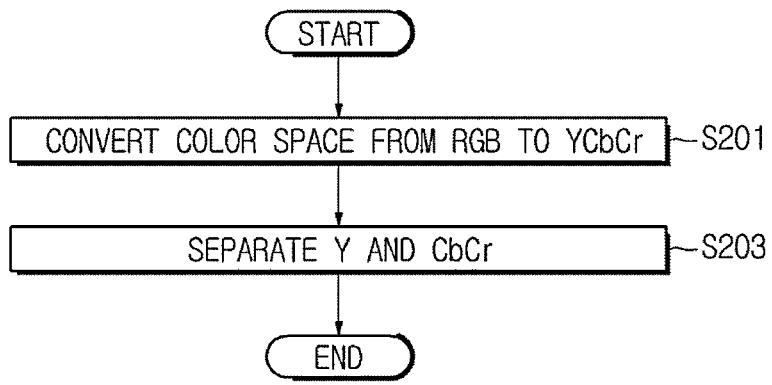
FIGS. 10 and 11 are flowcharts illustrating portions of FIG. 9 in detail.
Figure 11:
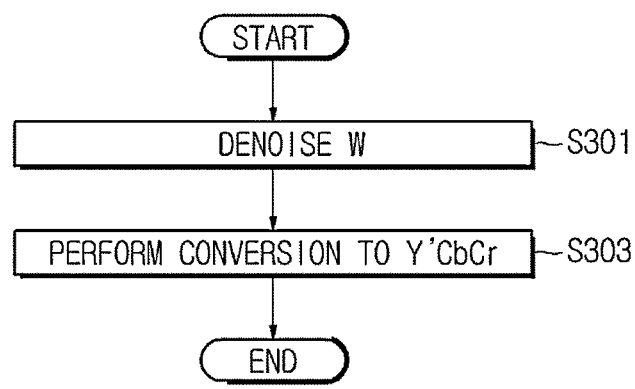

FIG. 9 is a flowchart illustrating an embodiment of the image signal processing method and FIGS. 10 and 11 are flowcharts illustrating portions of FIG. 9 in detail.

Hereinafter, the image signal processing method will be described with reference to FIGS. 5A to 5C illustrating a method of interpolating WRGB data, FIGS. 6 and 7 illustrating a denoising method of a white pixel signal, and FIG. 8 illustrating a method of mixing a white pixel signal and a luminance signal.

First, the image signal processing device 300 may interpolate input WRGB data (e.g., from the image sensor 200) (S101).

At this time, the image signal processing device 300 may apply bilinear interpolation to the input WRGB data to perform interpolation. However, embodiments of the invention are not limited thereto. For example, other interpolation methods, such as nearest neighbor interpolation, may be applied.

For example, the image signal processing device 300 may convert input WRGB data including $\{W_0, R_1, G_2, B_3\}$ (see FIG. 5A) into a form of FIG. 5B through down sampling and may calculate interpolated WRGB data as a form of W=$\{W_0, W_1, W_2, W_3\}$, R=$\{R_0, R_1, R_2, R_3\}$, G=$\{G_0, G_1, G_2, G_3\}$, B=$\{B_0, B_1, B_2, B_3\}$ as shown in FIG. 5C through full-restoration by interpolation.

Subsequently, the image signal processing device 300 may perform color space conversion on a second type pixel signal, a third type pixel signal, and a fourth type pixel signal of the interpolated WRGB data to generate first color space data (S103). The first color space data may be $YC_bC_r$ data, where Y may be a luminance signal and $C_b$ and $C_r$ may be color difference signals.

At this time, the image signal processing device 300 may generate first color space data through convolution of a matrix of the second, third, and fourth type pixel signals of the interpolated WRGB data, a color space conversion matrix, and a white balance correction matrix. The second type pixel signal, the third type pixel signal, and the fourth type pixel signal may be red, green, and blue, respectively. A first type pixel signal, which will hereinafter be described, may be white.

Referring to FIG. 10, at operation S103, the image signal processing device 300 may convert the second, third, and fourth type pixel signals (RGB) of the interpolated WRGB data into first color space data ($YC_bC_r$) (S201) and separate a luminance signal (Y) and color difference signals ($C_b$ and $C_r$) from the first color space data (S203).

At operation S201, the image signal processing device 300 may generate first color space data through convolution of a color space conversion matrix, a white balance correction matrix, and a matrix of the second to fourth type pixel signals of the interpolated WRGB data. At this time, the first color space data may be calculated by Equation 1 as described above.

Subsequently, the image signal processing device 300 may mix the luminance signal of the first color space data with a first type pixel signal to convert the first color space data into second color space data (S105). The first color space data may be $YC_bC_r$ data, where Y may be a luminance signal and $C_b$ and $C_r$ may be color difference signals. $YC_bC_r$ is a kind of color space used in imaging systems. $YC_bC_r$ may be referred to as YCC. $YC_bC_r$ is not an absolute color space but one of RGB information encoding modes. Colors of an image actually seen depend on original RGB information used to display signals. In addition, the second color space data may be $Y'C_bC_r$ data, where Y' may be a mixed signal of a luminance signal and a first type pixel signal. The first type pixel signal may be white. Second, third, and fourth type pixel signals may be red, green, and blue, respectively.

Referring to FIG. 11, at operation S105, when converting the first color space data ($YC_bC_r$) into the second color space data ($Y'C_bC_r$), the image signal processing device 300 may denoise the first type pixel signal (W) (S301) and mix the denoised first type pixel signal with the luminance signal (Y) to perform conversion to $Y'C_bC_r$ (S303).

Subsequently, the image signal processing device 300 may convert the second color space data into converted RGB data (S107).

At this time, the image signal processing device 300 may generate converted RGB data through convolution of a matrix of the second color space data, an inverse matrix of the white balance correction matrix, and an inverse matrix of the color space conversion matrix. The converted RGB data may be defined as data in which sensitivity characteristics of W are distributed to R, G, and B channels such that high sensitivity characteristics of W may be shared with the other channels unlike existing RGB data.

Subsequently, the image signal processing device 300 may color-correct the converted RGB data into output RGB data (S109). At this time, any color correction method may be applied so long as the color correction is a general color reproduction method.

Although not shown, the output RGB data corrected at operation S109 may be provided to an existing image signal processor (ISP; not shown) as Bayer RGB data.

In some embodiments, as described above, the WRGB color filter array from the image sensor 200 may be converted into Bayer RGB without changing hardware of the existing image signal processor (ISP).

Furthermore, the image signal processing device may increase low-light sensitivity to improve a low light condition, e.g. an SNR performance of 6 dB or more, and shorten exposure time to reduce motion artifacts.

In addition, the image signal processing device 300 may reduce color noise generated in a low light condition to improve SNR performance, thereby achieving a noise reduction effect.

That is, in some embodiments, sensitivity characteristics of W are distributed to R, G, and B channels such that high sensitivity characteristics of W may be shared with the other channels. Consequently, low-light SNR performance may be improved.

In accordance with one aspect of the image signal processing device and method and the image processing system using the same, as is apparent from the above description, the WRGB color filter array may be converted into Bayer RGB, thereby increasing low-light sensitivity and reducing noise.

In addition, when an image sensor having the WRGB color filter array is used in an electronic device (e.g., camera device 1), an existing image signal processor (ISP) for Bayer RGB may be used for "rear end" processing without changing hardware by converting the WRGB color filter array into Bayer RGB at a "front end" according to various embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image signal processing device comprising:
   a sensitivity improver that:
      interpolates input white, red, green, and blue (WRGB) data,
      mixes a luminance signal of first color space data for the input WRGB data with a first type pixel signal of the interpolated WRGB data to convert the first color space data into second color space data, and
      converts the second color space data into converted RGB data;
   a Bayer RGB converter that:
      converts color spaces of a second type pixel signal, a third type pixel signal, and a fourth type pixel signal of the interpolated WRGB data to generate the first color space data, and
      separates the luminance signal and color difference signals from the first color space data; and
   a color corrector to correct the converted RGB data into output RGB data.

2. The image signal processing device according to claim 1, wherein, when converting the first color space data into the second color space data, the sensitivity improver denoises the first type pixel signal and mixes the luminance signal with the denoised first type pixel signal.

3. The image signal processing device according to claim 1, wherein the sensitivity improver applies bilinear interpolation to the input WRGB data to perform full-restoration by interpolation.

4. The image signal processing device according to claim 1, wherein the Bayer RGB converter generates the first color space data through convolution of a color space conversion matrix, a white balance correction matrix, and a matrix of the second, third, and fourth type pixel signals of the interpolated WRGB data.

5. The image signal processing device according to claim 4, wherein the first color space data are calculated as:

$$\begin{pmatrix} Y \\ Cb \\ Cr \end{pmatrix} = \begin{pmatrix} YCC_0 & YCC_1 & YCC_2 \\ YCC_3 & YCC_4 & YCC_5 \\ YCC_6 & YCC_7 & YCC_8 \end{pmatrix} * \begin{pmatrix} WB_R & & \\ & 1 & \\ & & WB_B \end{pmatrix} * \begin{pmatrix} R \\ G \\ B \end{pmatrix}$$

Where $$\begin{pmatrix} Y \\ Cb \\ Cr \end{pmatrix}$$

is a matrix of the first color space data, $$\begin{pmatrix} YCC_0 & YCC_1 & YCC_2 \\ YCC_3 & YCC_4 & YCC_5 \\ YCC_6 & YCC_7 & YCC_8 \end{pmatrix}$$

is a color space conversion matrix, $$\begin{pmatrix} WB_R & & \\ & 1 & \\ & & WB_B \end{pmatrix}$$

is a white balance correction matrix, and $$\begin{pmatrix} R \\ G \\ B \end{pmatrix}$$

is a matrix of the second, third, and fourth type pixel signals of the interpolated WRGB data.

6. The image signal processing device according to claim 4, wherein the sensitivity improver generates the converted RGB data through convolution of an inverse matrix of the white balance correction matrix, an inverse matrix of the color space conversion matrix, and a matrix of the first color space data.

7. The image signal processing device according to claim 6, wherein the converted RGB data are calculated as:

$$\begin{pmatrix} R_W \\ G_W \\ B_W \end{pmatrix} = \begin{pmatrix} WB'_R & & \\ & 1 & \\ & & WB'_B \end{pmatrix} * \begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix} * \begin{pmatrix} Y \\ Cb \\ Cr \end{pmatrix}$$

Where $$\begin{pmatrix} R_W \\ G_W \\ B_W \end{pmatrix}$$

is a matrix of the converted RGB data, $$\begin{pmatrix} WB'_R & & \\ & 1 & \\ & & WB'_B \end{pmatrix}$$

is an inverse matrix of a white balance correction matrix, $$\begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix}$$

is an inverse matrix of a color space conversion matrix, and $$\begin{pmatrix} Y \\ Cb \\ Cr \end{pmatrix}$$

is a matrix of the first color space data.

8. The image signal processing device according to claim 1, wherein the first color space data are $YC_bC_r$ data, where Y is the luminance signal and $C_b$ and $C_r$ are the color difference signals.

9. The image signal processing device according to claim 1, wherein the second color space data are $Y'C_bC_r$ data, where Y' is a mixed signal of the luminance signal and the first type pixel signal and Cb and $C_r$ are the color difference signals.

10. The image signal processing device according to claim 1, wherein the first type pixel signal is white, the second type pixel signal is red, the third type pixel signal is green, and the fourth type pixel signal is blue.

11. An image signal processing method comprising:
    interpolating input WRGB data;
    converting color spaces of a second type pixel signal, a third type pixel signal, and a fourth type pixel signal of the interpolated WRGB data to generate first color space data;
    mixing a luminance signal of the first color space data with a first type pixel signal of the interpolated WRGB data to convert the first color space data into second color space data;
    converting the second color space data into converted RGB data;
    color-correcting the converted RGB data into output RGB data; and
    outputting the output RGB data to an image signal processor.

12. The image signal processing method according to claim 11, wherein the generating of the first color space data comprises generating the first color space data through convolution of a matrix of the second, third, and fourth type pixel signals of the interpolated WRGB data, a color space conversion matrix, and a white balance correction matrix.

13. The image signal processing method according to claim 12, wherein the converting of the second color space data into the converted RGB data comprises generating the converted RGB data through convolution of a matrix of the second color space data, an inverse matrix of the white balance correction matrix, and an inverse matrix of the color space conversion matrix.

14. The image signal processing method according to claim 11, further comprising:

separating the luminance signal and color difference signals from the first color space data, wherein the separating of the luminance signal and the color difference signals from the first color space data is performed after the generating of the first color space data and before the converting the first color space data into the second color space data.

15. The image signal processing method according to claim 11, wherein the converting of the first color space data into the second color space data comprises:

denoising the first type pixel signal when converting the first color space data into the second color space data; and mixing the denoised first type pixel signal with the luminance signal.

16. The image signal processing method according to claim 11, wherein the first color space data are $YC_bC_r$ data, where Y is the luminance signal and $C_b$ and $C_r$ are color difference signals.

17. The image signal processing method according to claim 11, wherein the second color space data are $Y'C_bC_r$ data, where Y' is a mixed signal of the luminance signal and the first type pixel signal and $C_b$ and $C_r$ are color difference signals.

18. The image signal processing method according to claim 11, wherein the first type pixel signal is white, the second type pixel signal is red, the third type pixel signal is green, and the fourth type pixel signal is blue.

19. An image processing system comprising:

an image sensor that captures an image of a subject through incident light; and an image signal processing device that converts input WRGB data received from the image sensor into Bayer RGB data, wherein the image signal processing device comprises:

a sensitivity improvement unit that:
  interpolates input white, red, green, and blue (WRGB) data,
  mixes a luminance signal of first color space data for the interpolated WRGB data with a first type pixel signal of the interpolated WRGB data to convert the first color space data into second color space data, and
  converts the second color space data into converted RGB data;

a Bayer RGB conversion unit that:
  converts color spaces of a second type pixel signal, a third type pixel signal, and a fourth type pixel signal of the interpolated WRGB data to generate the first color space data, and
  separates the luminance signal and color difference signals from the first color space data; and a color correction unit to correct the converted RGB data into output RGB data.

20. The image processing system according to claim 19, wherein the first type pixel signal is white, the second type pixel signal is red, the third type pixel signal is green, and the fourth type pixel signal is blue.

* * * * *